United States Patent [19]
Schultz

[11] Patent Number: 5,255,296
[45] Date of Patent: Oct. 19, 1993

[54] COLLECTING AND RECIRCULATING CONDENSATE IN A NUCLEAR REACTOR CONTAINMENT

[75] Inventor: Terry L. Schultz, Murrysville Boro, Pa.

[73] Assignee: Westinghouse Electric Corp., Pittsburgh, Pa.

[21] Appl. No.: 903,639

[22] Filed: Jun. 24, 1992

[51] Int. Cl.$^5$ ............................................. G21C 15/18
[52] U.S. Cl. ................................................. 376/299
[58] Field of Search ........................ 376/298, 299, 282

[56] References Cited

U.S. PATENT DOCUMENTS

| | | | |
|---|---|---|---|
| 2,667,041 | 1/1954 | Henderson | 165/135 |
| 3,174,540 | 3/1965 | Dutton | 165/115 |
| 3,929,567 | 12/1975 | Schabert et al. | 376/298 |
| 3,966,548 | 6/1976 | Muller et al. | 376/282 |
| 4,072,170 | 2/1978 | Sagner et al. | 376/283 |
| 4,587,080 | 5/1986 | Johnson | 376/299 |
| 4,609,523 | 9/1986 | Gerlowski | 376/282 |
| 4,668,467 | 5/1987 | Miler et al. | 376/299 |
| 4,753,771 | 6/1988 | Conway et al. | 376/299 |
| 5,102,616 | 4/1992 | Gardner et al. | 376/299 |

Primary Examiner—Daniel D. Wasil
Attorney, Agent, or Firm—J. C. Valentine

[57] ABSTRACT

An arrangement passively cools a nuclear reactor in the event of an emergency, condensing and recycling vaporized cooling water. The reactor is surrounded by a containment structure and has a storage tank for cooling liquid, such as water, vented to the containment structure by a port. The storage tank preferably is located inside the containment structure and is thermally coupleable to the reactor, e.g. by a heat exchanger, such that water in the storage tank is boiled off to carry away heat energy. The water is released as a vapor (steam) and condenses on the cooler interior surfaces of the containment structure. The condensed water flows downwardly due to gravity and is collected and routed back to the storage tank. One or more gutters are disposed along the interior wall of the containment structure for collecting the condensate from the wall. Piping is provided for communicating the condensate from the gutters to the storage tank.

17 Claims, 3 Drawing Sheets

COLLECTING AND RECIRCULATING CONDENSATE IN A NUCLEAR REACTOR CONTAINMENT

GOVERNMENT CONTRACT

The Government of the United States of America has rights in this invention pursuant to Contract No. DE-AC03-90SF18495 awarded by the Department of Energy.

BACKGROUND OF THE INVENTION

The invention relates to an apparatus for collecting water or other condensate from the interior of a nuclear reactor containment structure, and recycling the condensate for reuse in an emergency heat exchange process whereby excess heat is removed from the core and transferred to the containment structure.

Modern nuclear reactors such as pressurized water reactors have a pressurized reactor vessel containing the nuclear fuel, coupled to a primary reactor circuit wherein the primary coolant is circulated over the fuel in the reactor vessel and through an electrical generator which extracts the energy imparted to the primary coolant by the fuel. The reactor is surrounded by a containment structure intended to prevent a large scale leak of radioactivity into the environment in the event of a reactor mishap. For example, if the primary coolant system provided for transferring heat from the reactor core to the electrical generator fails, e.g., from loss of primary coolant pressure due to a leak or rupture in a connecting line, the reactor may quickly overheat. Some known reactors include a large water storage tank inside the containment structure, which provides a thermal mass for use as a heat sink in the event of a nuclear accident. A heat exchanger located in the water storage tank transfers heat from the reactor vessel and fuel to the water in the storage tank, thereby providing both a sink and a thermal transfer means to carry heat away from the core.

U.S. Pat. No. 4,668,467—Miler et al. discloses a safety cooling installation for a nuclear reactor wherein a large reservoir stores cooling water outside of the containment structure. In the event of a nuclear emergency, cooling water is directed from the reservoir into the containment structure, being emitted through a spray manifold near a top of the containment structure, or simply pumped into the containment structure to accumulate at a sump in the bottom of the containment structure, which is allowed to fill until the cooling liquid reaches a predetermined level. If the emergency is due to a rupture of the primary reactor circuit, the cooling water becomes mixed with the primary coolant. When the cooling liquid has, reached the predetermined level, the liquid is pumped from the sump through an external air heat exchanger, and back into the containment structure, in a heat exchange loop intended to carry away the heat of the core. If necessary, additional water can be injected from the reservoir.

The cooling spray acts to moderate the temperature of the nuclear reactor and thus to reduce pressure in the containment structure. However, Miler requires a water supply that is external of the containment structure and a number of elements such as a pump and heat exchanger, which require regular maintenance.

U.S. Pat. No. 3,929,567—Schabert et al teaches a safety system which is operable to flood the core in the event of an accident. A quantity of water is stored in tanks high in the containment structure, and released in the event of an accident. The high position of stored water provides a pressure head to help overcome any pressure in the primary circuit. Once released, a heat exchange loop including a heat exchanger located outside of the containment structure operates to remove excess heat. Like Miler, this arrangement relies on pumps and valves for moving the cooling water through a heat exchange loop, requiring maintenance as well as expenditure for conduits, valves and pumps.

The present invention provides a thermal heat sink in the form of a quantity of cooling water which can flood the containment structure or be coupled thermally to the reactor core via heat exchange means. However, the invention provides a safety cooling system which collects and recirculates cooling water in a passive operation.

In the event of a nuclear accident, the water in even a large heat sink tank may heat to boiling in several hours. The water remains at a constant boiling temperature (assuming constant pressure) until the heat energy is sufficient to change the phase of all the water from liquid to gas, i.e., steam. Steam produced by boiling the water in the heat sink tank is released into the interior of the containment structure. Whereas the walls of the containment shell are relatively cooler than the steam, the water condenses on the walls and drains down into lower parts of the containment structure where it would remain. Without means for recovering this water, the contents of the heat sink tank could completely boil away into the containment, for example over several days. If another cooling means has not been secured before, the reactor temperature will rise uncontrollably and a melt down of the reactor core may occur.

In order to reduce the dependence on the operator and to prevent such a melt down, there is a need to permit the heat exchanger to operate for an essentially indefinite time. This could be accomplished by replenishing the water in a heat sink water storage tank. The water could be replenished from an outside source, but the problem still remains keeping the storage tank supplied with water for an essentially indefinite time. Further, for reliability reasons it would be desirable to have a passive supply of water that is not dependent upon an outside source, or upon pumps, valves, and other devices which require maintenance.

The present invention provides an apparatus for passive recirculation of a cooling liquid inside of a nuclear containment structure. Vaporized cooling liquid condenses on the interior of the containment structure which is itself cooled by a passive system utilizing natural circulation of air and evaporation of water U.S. Pat. No. 4,753,771—Conway). The condensate is collected in suitable drip collection gutters and conduits, and returned to the heat sink water storage tank by gravitational force. The cooling liquid can be recirculated indefinitely, and although it is possible to supplement cooling by externally cooling the containment structure, no external supply of cooling liquid is required. Moreover, radioactivity released in the containment structure remains there because there is no requirement for a flowpath including an external heat exchanger.

SUMMARY OF THE INVENTION

It is an object of the invention to provide a passive cooling arrangement for a nuclear reactor containment structure, wherein condensate is recycled to a heated reservoir, for cooling or supplementing cooling in the event of an accident requiring cooling of the reactor vessel or core.

It is also an object of the invention to minimize reliance on pumps, valves and the like, in an emergency cooling system for a reactor containment structure.

It is a further object of the invention to extend the useful time of an emergency water heat sink reservoir, by recovering and recycling condensate on the inner walls of a containment structure in which the reservoir is disposed.

It is another object of the invention to collect condensate in a manner that produces a spray in the containment structure from a portion of the condensate which is collected.

These and other objects are accomplished in a method and apparatus for passive cooling of a nuclear reactor surrounded by a containment structure and having a cooling liquid storage tank disposed therein and thermally coupled to extract heat from the reactor core such that cooling liquid in the storage tank is released as a vapor to an interior of the containment structure. Vapor condensing on interior walls of the containment structure and flowing downwardly due to gravitational force is collected via one or more drip catchers, gutters and/or conduits disposed along the interior wall for receiving at least some of the condensate from the wall, and communicating the condensate from the gutter to the storage tank. Valving can be provided for directing a flow of the condensate to either a drain tank or the liquid storage tank. For a typical containment structure which is cylindrically shaped and has a domed top, the liquid storage tank can be disposed at a position low in the structure, below the operating deck, and a gutter is disposed circumferentially along the interior wall on the operating deck, communicating with the liquid storage tank. Another gutter preferably is disposed in a ring-shape at the dome for receiving condensate that tends to drip from the dome, and a further gutter may be disposed on a girder which supports a crane within the containment structure. The piping means may include a valve for restricting a flow of the condensate in piping means coupled to one or more gutters which are located high in the containment structure, whereby the condensate collected by these gutters is arranged to overflow the gutter to produce a passive spray for removing radioactivity in the air within the containment structure. The piping means can also include a branch having a purge tank which contains a chemical additive such as a base, for improving the trapping and retention of radioactive iodine in the heat sinking tank. Valve means are operable to selectively enable flow of the condensate through the branch, whereby some of the chemical additive is dissolved thin the condensate and is transported to the liquid storage tank to affect a condition of the cooling liquid.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
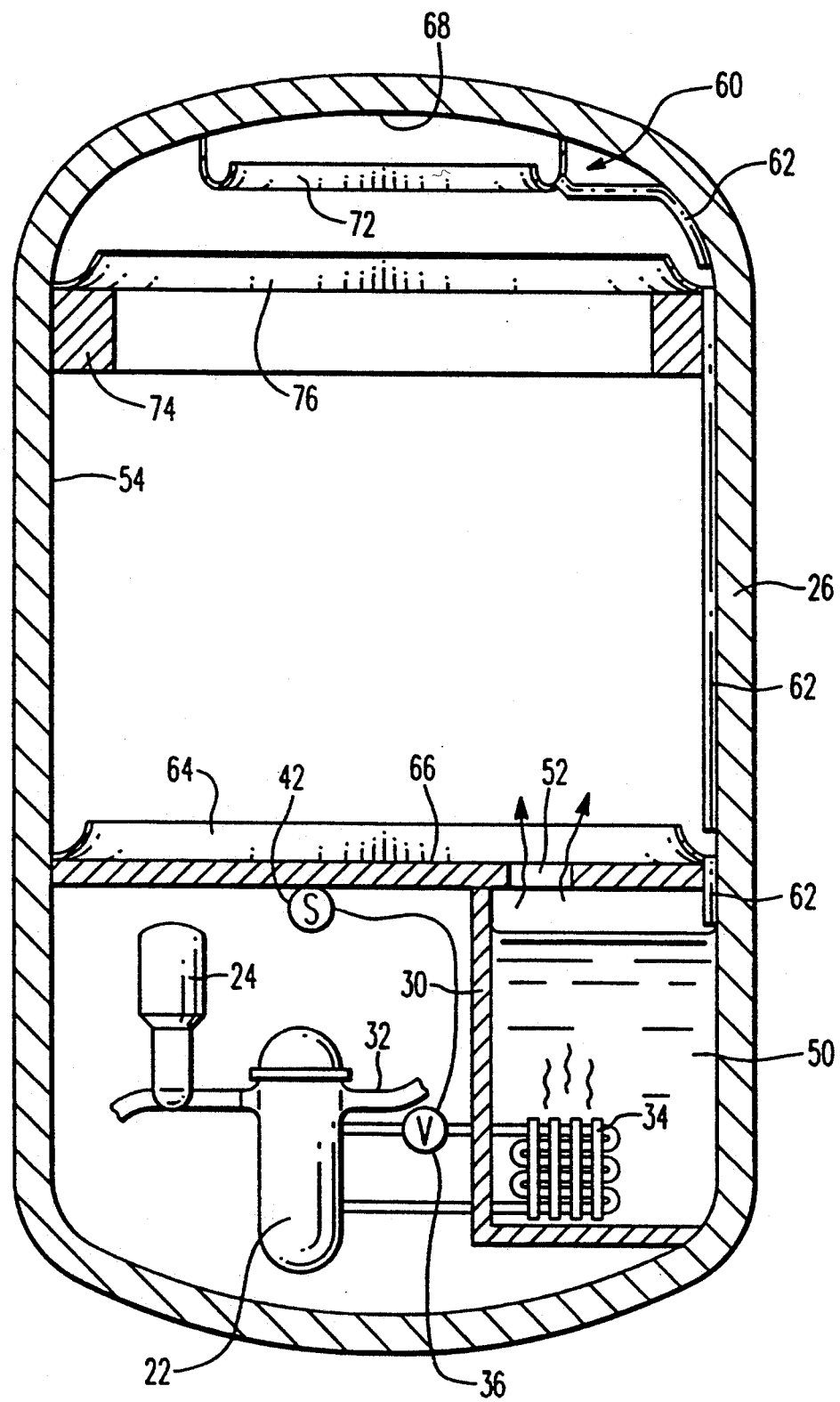
FIG. 1 is a cross-sectional view of an apparatus for passive cooling of a nuclear reactor according to the invention, the apparatus being disposed in a nuclear reactor containment structure.

An apparatus for passive cooling of a nuclear reactor according to the invention is shown in FIG. 1. A nuclear reactor comprising a reactor vessel 22 and a steam generator 24 is surrounded by a containment structure 26 having a storage tank 30 disposed therein. The storage tank 30 contains a cooling liquid such as water, which can be boiled to absorb excess heat. In the event of an accident the cooling liquid storage tank 30 is thermally coupled to the core of the reactor and allowed to boil at the ambient pressure in the containment structure 26.

The cooling water can, for example, be released from a storage location into thermal contact with the reactor vessel 22, with the fuel in the reactor vessel, or with a section of the primary coolant circuit, including the primary cooling circuit ducting 32 that connects the core vessel 22 and the steam generator 24.

In the event of an accident or upon detection of anomalous operating conditions, the reactor is normally shut down promptly or "scrammed" by fully inserting reaction damping control rods into the fuel assemblies in the reactor core. However, residual heat remains, and it is possible that the accident may be such that a full shutdown is not possible. The remaining heat of the core is an emergency thermal load which must be transferred away from the core to avoid damage or possible melt down.

In FIG. 1, the cooling tank or reservoir 30 is coupled to this emergency thermal load via a heat exchanger 34 in a loop with primary coolant passing through the reactor vessel 22. The primary coolant is heated by fuel in the core within the reactor vessel 22, which produces a powerful axial flow due to convection. The heat exchanger 34 in the storage tank 30 can be coupled to the reactor vessel 22 via conduits leading to the inlet and outlet sides of the primary coolant circuit 32, with a valve 36 opening the connection in the event of an emergency. The valve 36 can thereby activate the emergency cooling apparatus, for example upon detection of adverse conditions by a remote sensor 42, or upon a control signal which may be generated in the event of a reactor emergency shutdown or scram.

The cooling liquid 50 in the storage tank forms a heat sink, and is exposed to the air in the containment structure 26 via at least one port 52, whereby the storage tank 30 remains at the same pressure as the inside of the containment structure 26. The cooling liquid 50, preferably water, is heated, eventually boiled, and released as a vapor (steam) into the interior of the containment structure 26.

The interior walls 54 of the containment structure are much cooler than the steam emitted from the storage tank 30. Vapor condenses on interior walls 54 of the containment structure 26 and flows downwardly due to gravity, along the surfaces of the interior walls 54. Collection means 60 for this condensate are disposed along the interior walls 54 for, collecting at least some of the condensate from the walls, and communicate via pipes, aqueducts, gutters and/or similar conduits 62 to move the collected condensate from the collection means to the storage tank 30. The cooling liquid 50 absorbs heat at storage tank 30 upon changing from the liquid to gaseous phase, releases the heat at the walls 54 of the containment structure 26 when condensing back into liquid, and flows back to the storage tank 30 to repeat the process.

The collection means 60 preferably are disposed around substantially the full perimeter of the containment structure 26. For a containment structure which is cylindrical, the collection means can include a gutter 64 disposed circumferentially along a lower part of the interior wall 54. For containment means including an operating deck 66, the gutter 64 is conveniently disposed at the level of the operating deck 66, and the reservoir 30 is disposed at a lower level, such that the collected condensate is returned to the reservoir 30 by gravity. Collection efficiency can be improved by placing a number of gutters at different elevations on the internal walls 54 of the containment structure 26, each coupled to the piping means 62 for conveying collected water back to the reservoir. It is also possible to arrange a single length of gutter arranged helically, to collect condensate at different levels on the internal walls 54.

For a containment structure having an interior wall which defines a substantially horizontal panel such as a dome 68 at a top of the containment structure 26, the collection means 60 includes a gutter 72 disposed beneath the dome 68 and structured appropriately for collecting condensate from the dome. For this purpose, gutter 72 can be ring-shaped, and can include drip collection extensions leading into the gutter, particularly placed under the most horizontal parts of the dome 68.

Containment structures often include a girder 74 for supporting a polar crane (not shown) used to manipulate reactor elements during maintenance operations and the like. In that case, the collection means can include a gutter 76 supported on the girder 74 and arranged to collect condensate along the interior walls 54. Each of the gutters 64, 72, 76 preferably has a channel shape or otherwise open upper side, adapted to collect drops of condensate which flow downwardly along the interior wall of the containment structure into the gutter, and then downwardly by gravity to the storage tank 30.

Figure 2:
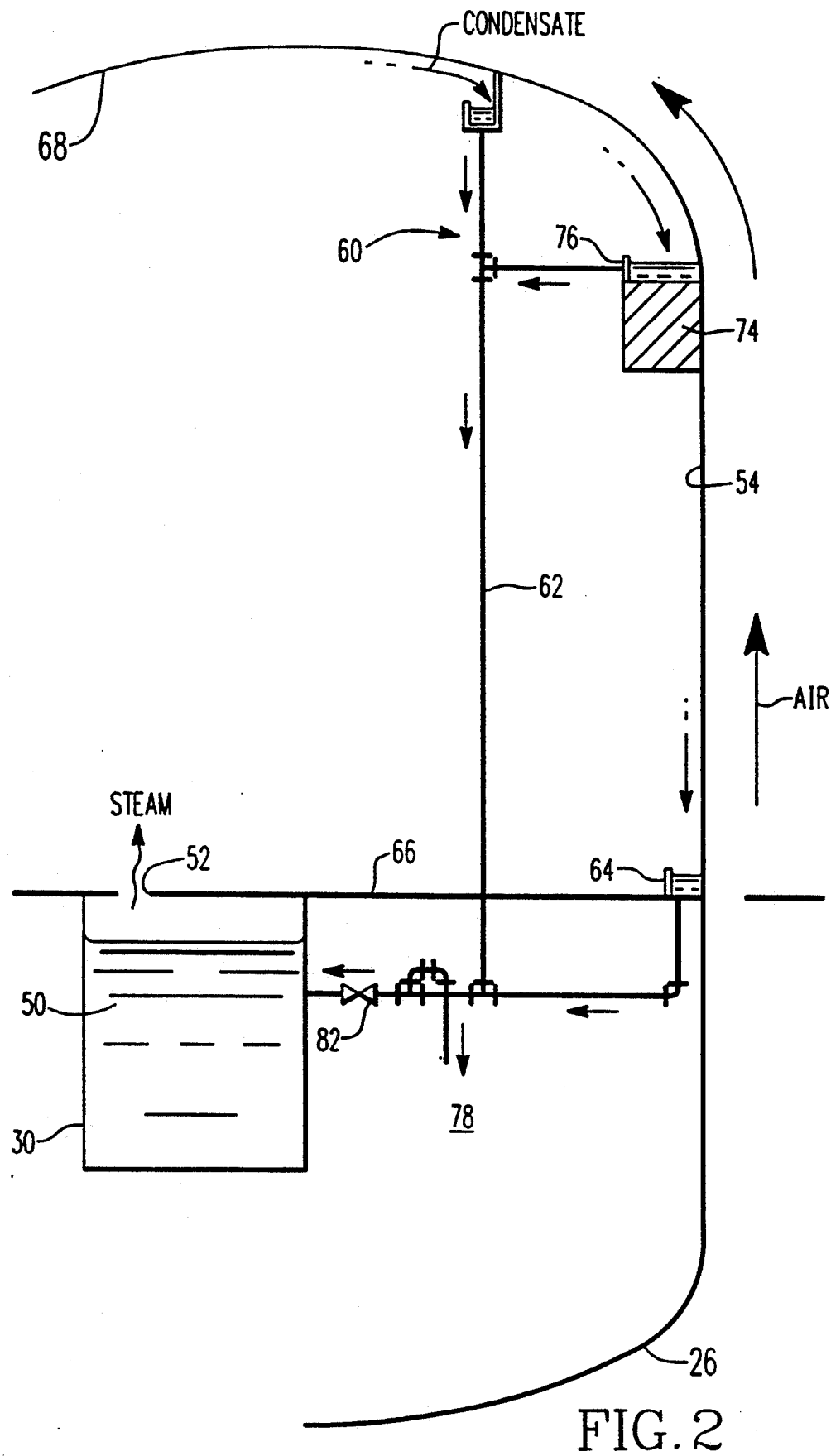
FIG. 2 is a schematic view of a piping arrangement for the apparatus for passive cooling according to the invention.

As shown schematically in FIG. 2, each of the gutters connects to a leg of the piping means 62 which communicates the collected condensate to the storage tank 30. The piping means 62 may also couple to a drain tank 78 disposed between the collection means 60 and the storage tank 30. An associated valve 82 is operable to selectively control flow of the condensate to either the drain tank 78 or the storage tank 30.

A small amount of condensate may be collected under normal operating conditions of the reactor, due to a high relative humidity in the containment structure 26 and cool surface temperatures of the interior walls 54. Under such non-emergency conditions, the condensate can be directed to the drain tank 78 so that returning condensate does not affect the chemistry of the liquid 50 in the storage tank 30. During an emergency, the valve 82 can be moved to permit the condensate to flow directly to the storage tank 30. The piping means 62 may comprise two or more conduits 84 leading from the gutters 64, 72, 76 to the storage tank 30 and the drain tank 78.

Figure 3:
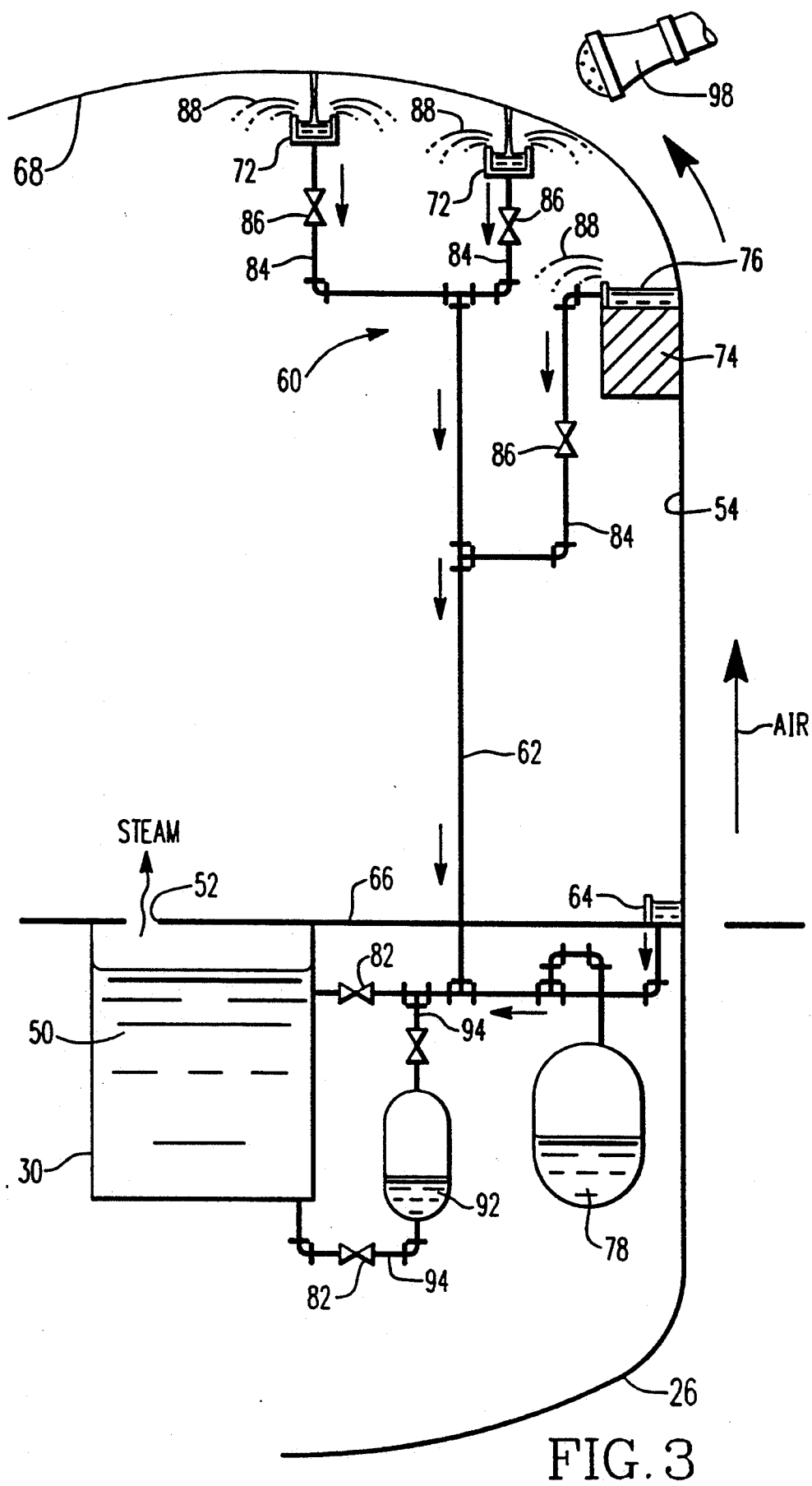
FIG. 3 is a schematic view of a piping and valve arrangement for an alternative embodiment of the passive, cooling apparatus according to the invention.

The apparatus for passive cooling can be used to provide a liquid spray within the containment structure 26 for sweeping radioactive dust and the like from the atmosphere in the containment structure. As shown in FIGURE 3, an embodiment with spray capability has piping means including valves 86 which are operable to restrict a flow of the condensate in the piping means 62. By restricting or closing off flow from certain of the gutters using the valves 86, the condensate in the gutters accumulates and overflows the gutters, with drops 88 of condensate falling, through the air in the containment structure 26 to the level of the operating deck 66, picking up radioactive dust as they fall. The valves may be controlled automatically, for example opening in response to a signal from the remote sensor 42 indicating high containment pressure or radiation. The valves may also be self-actuated types such as are used in fire sprinkler systems. Liquid thus accumulating on the operating deck 66 can be directed to the deck gutter 64 for ultimate return to the storage tank 30.

According to another aspect of the invention, a purge tank 92 containing a chemical additive can be included in the flow path of collected condensate. The purge tank 92 can contain a Ph adjustment additive such as sodium hydroxide, for raising the Ph of the coolant liquid 50 to better trap and retain radioactive ions such as iodine, which may be released in the containment structure 26. In this embodiment as shown in FIG. 3, the piping means 62 includes a branch 94 having the purge tank 92 and valves which are operable selectively to enable flow of the condensate through the branch having the purge tank 92, whereby some or all of the chemical additive will be dissolved in the condensate and transported to the storage tank 30 for adjusting a chemical composition of the liquid coolant 50.

The invention has the advantage that the emergency cooling water which is boiled away in the reservoir is not simply used and lost, but can be recovered and re-used. This extends the protection time of the emergency cooling system, and can be provided alone, together with an external means 98 for cooling the containment structure, such as a flow of water directed on the outer surface, or as a supplement to other cooling means.

The invention having been disclosed, a number of alternatives will now become apparent to those skilled in the art. The foregoing embodiments are illustrative, and are not intended to limit the particulars of the invention in which exclusive rights are claimed. Reference should be made to the appended claims rather than the discussion of preferred embodiments, in order to assess the scope of the invention in which exclusive rights are claimed.

I claim:

1. A cooling apparatus for a nuclear reactor substantially enclosed in a containment structure, comprising:
   a liquid storage tank disposed in the containment structure, the liquid storage tank being thermally coupleable to a heat source of the nuclear reactor in event of emergency and containing a cooling liquid exposed to air in the containment structure, whereby the cooling liquid in the storage tank is released as a vapor into an interior of the containment structure, forms a condensate on an interior wall of the containment structure, and flows downwardly due to gravity;
   collection means disposed along the interior wall for collecting at least some of the condensate from the wall;

piping means coupling the collection means to the storage tank operable to communicate the condensate from the collection means to the storage tan, whereby the cooling liquid is recycled and reused; ad, a drain tank coupled by the piping means between the collection means and the storage tank, and further comprising valve means selectively operable to open and close a connection between the drain tank and the storage tank, said valve means being arranged to empty the drain tank into the storage tank in the event of emergency.

2. The cooling apparatus according to claim 1, further comprising a heat exchanger operable thermally to couple the cooling liquid in the storage tank to the heat source of the nuclear reactor.

3. The passive cooling apparatus according to claim 1, wherein the collection means comprises at least one gutter extending substantially around a full inner perimeter of the containment structure.

4. The cooling apparatus according to claim 5, wherein the collection means comprises a plurality of gutters extending around the perimeter of the containment structure at different elevations.

5. The cooling apparatus according to claim 4, wherein the piping means includes valve means operable to restrict a flow of the condensate from at least one gutter of relatively higher elevation, such that a portion of the condensate overflows the gutter to fall through the containment structure.

6. The cooling apparatus according to claim 5, wherein the interior wall of the containment structure is cylindrical, and wherein the at least one gutter is disposed circumferentially along the interior wall.

7. The cooling apparatus according to claim 1, wherein the containment structure includes at least one substantially horizontal panel, and the collection means includes a drip catching structure located under the substantially horizontal panel.

8. The cooling apparatus according to claim 7, wherein the containment structure defines a top dome and the collection means includes a gutter disposed beneath the dome for collecting condensate from the dome.

9. The cooling apparatus according to claim 8, wherein the gutter is substantially ring-shaped.

10. The cooling apparatus according to claim 8, wherein the piping means includes valve means operable to restrict a flow of the condensate from said gutter disposed beneath the dome, whereby the condensate overflows the gutter to fall through the containment structure.

11. The cooling apparatus according to claim 1, further comprising means for externally cooling the containment structure.

12. The cooling apparatus according to claim 1, further comprising at least one sensor operable to detect conditions representing the emergency, and further comprising at least one valve responsive to the sensor for initiating operation of the passive cooling apparatus.

13. A cooling apparatus for a nuclear reactor substantially enclosed in a containment structure, comprising:
a liquid storage tank disposed in the containment structure, the liquid storage tank being thermally coupleable to a heat source of the nuclear reactor in event of emergency and containing a cooling liquid exposed to air in the containment structure, whereby the cooling liquid in the storage tank is released as a vapor into an interior of the containment structure, forms a condensate on an interior wall of the containment structure, and flows downwardly due to gravity;

collection means disposed along the interior wall from collecting at least some of the condensate from the wall;

piping means coupling the collection means to the storage tank operable to communicate the condensate from the collection means to the storage tank, whereby the cooling liquid is recycled and reused; and wherein the containment structure includes an operating deck at a higher elevation than the storage tank, and at least one said gutter is disposed on the operating deck.

14. A cooling apparatus for a nuclear reactor substantially enclosed in a containment structure, comprising:
a liquid storage tank disposed in the containment structure, the liquid storage tank being thermally coupleable to a heat source of the nuclear reactor in event of emergency and containing a cooling liquid exposed to air in the containment structure, whereby the cooling liquid in the storage tank is released as a vapor into an interior of the containment structure, forms a condensate on an interior wall of the containment structure, and flows downwardly due to gravity;

collection means disposed along the interior wall for collecting at least some of the condensate from the wall;

piping means coupling the collection means to the storage tank operable to communicate the condensate from the collection means to the storage tank, whereby the cooling liquid is recycled and reused; and, a girder in the containment structure for supporting a crane, and wherein the collection means includes a gutter supported on the girder.

15. A cooling apparatus for a nuclear reactor substantially enclosed in a containment structure, comprising: a liquid storage tank disposed in the containment structure, the liquid storage tank being thermally coupleable to a heat source of the nuclear reactor in event of emergency and containing a cooling liquid exposed to air in the containment structure, whereby the cooling liquid in the storage tank is released as a vapor into an interior of the containment structure, forms a condensate on an interior wall of the containment structure, and flows downwardly due to gravity;

collection mans disposed along the interior wall for collecting at least some of the condensate from the wall;

piping means coupling the collection means to the storage tank operable to communicate the condensate from the collection means to the storage tank, whereby the cooling liquid is recycled and reused;

a purge tank coupled t one of the piping means and the storage tank, the purge tank containing a chemical additive for chemically altering the cooling liquid in the storage tank; and, wherein the purge tank is disposed in a branch of the piping means, and further comprising valve means operable to selectively enable flow of the condensate through the branch for addition of the chemical additive.

16. The cooling apparatus according to claim 15, wherein the chemical additive comprising a base, whereby radioactive ions in the containment structure are captured in the storage tank.

17. The cooling apparatus according to claim 15, further comprising a drain tank coupled by the piping means between the collection means and the storage tan, and further comprising valve means selectively operable to open and close a connection between the drain tank and the storage tank, said valve means being arranged to empty the drain tank into the storage tank in the event of emergency.

* * * * *